(12) United States Patent
Peng

(10) Patent No.: US 9,251,819 B2
(45) Date of Patent: Feb. 2, 2016

(54) MODE CONVERTER COUPLING ENERGY AT A HIGH-ORDER TRANSVERSE ELECTRIC MODE TO A PLASMONIC TRANSDUCER

(71) Applicant: Seagate Technology LLC, Cupertino, CA (US)

(72) Inventor: Chubing Peng, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 43 days.

(21) Appl. No.: 14/078,280

(22) Filed: Nov. 12, 2013

(65) Prior Publication Data

US 2015/0131415 A1 May 14, 2015

(51) Int. Cl.
*G11B 5/48* (2006.01)
*G11B 5/60* (2006.01)
*G11B 5/127* (2006.01)
*G11B 5/00* (2006.01)

(52) U.S. Cl.
CPC ............ *G11B 5/4866* (2013.01); *G11B 5/1278* (2013.01); *G11B 5/6088* (2013.01); *G11B 2005/0021* (2013.01)

(58) Field of Classification Search
CPC ........... G11B 2005/0021; G11B 5/314; G11B 5/6088; G11B 2005/0005; G11B 2005/001; G11B 5/1278; G11B 5/3116; G02B 6/125
See application file for complete search history.

(56) References Cited

U.S. PATENT DOCUMENTS

| | | | |
|---|---|---|---|
| 5,127,081 A | 6/1992 | Koren et al. | |
| 5,373,575 A * | 12/1994 | Yamamoto et al. | 385/122 |
| 5,479,551 A | 12/1995 | D'Giovanni et al. | |
| 8,078,021 B2 | 12/2011 | Ushida | |
| 8,085,473 B2 | 12/2011 | Itagi et al. | |
| 8,248,891 B2 * | 8/2012 | Lee | G11B 5/314 360/125.74 |
| 8,307,540 B1 * | 11/2012 | Tran et al. | 29/603.16 |
| 8,385,183 B2 | 2/2013 | Peng et al. | |
| 8,565,049 B1 * | 10/2013 | Tanner | G11B 5/3136 369/13.03 |
| 8,670,294 B1 * | 3/2014 | Shi et al. | 369/13.24 |
| 2010/0188768 A1 * | 7/2010 | Itagi | G11B 5/314 360/59 |
| 2010/0271910 A1 * | 10/2010 | Boutaghou | B82Y 10/00 369/13.33 |
| 2010/0284252 A1 * | 11/2010 | Hirata | G11B 5/02 369/13.33 |
| 2011/0170381 A1 * | 7/2011 | Matsumoto | 369/13.33 |
| 2011/0181979 A1 * | 7/2011 | Jin et al. | 360/59 |
| 2013/0223196 A1 * | 8/2013 | Gao | G11B 5/6088 369/13.24 |
| 2014/0036646 A1 * | 2/2014 | Peng | G11B 13/08 369/13.33 |

OTHER PUBLICATIONS

Ramadan et al., "Adiabatic Couplers: Design Rules and Optimization," Journal of Lightwave Technology, vol. 16, No. 2, Feb. 1998, pp. 277-283.
Huang, "Coupled-mode theory for optical waveguides: an overview," J. Opt. Soc. Am. A., vol. 11, No. 3, Mar. 1994, pp. 963-983.
Yajima, "Dielectric thinfilm optical branching waveguide," Applied Physics Letters, vol. 22, No. 647, 1973, pp. 1-4.

* cited by examiner

*Primary Examiner* — Dionne Pendleton
(74) *Attorney, Agent, or Firm* — Hollingsworth Davis, LLC

(57) ABSTRACT

A waveguide is configured to couple light from a light source at a fundamental transverse electric (TE) mode. A mode converter outputs the light to an output region of the waveguide at a higher-order TE mode. A plasmonic transducer receives the light at the higher order TE mode and generates surface plasmons that heat a recording medium. The plasmonic transducer includes: an input end proximate the output region of the waveguide and comprising a first convex curved edge; an output end proximate a surface that faces the recording medium, the output end comprising a second convex curved edge and a peg; and linear edges between the first and second convex curved edges.

20 Claims, 12 Drawing Sheets

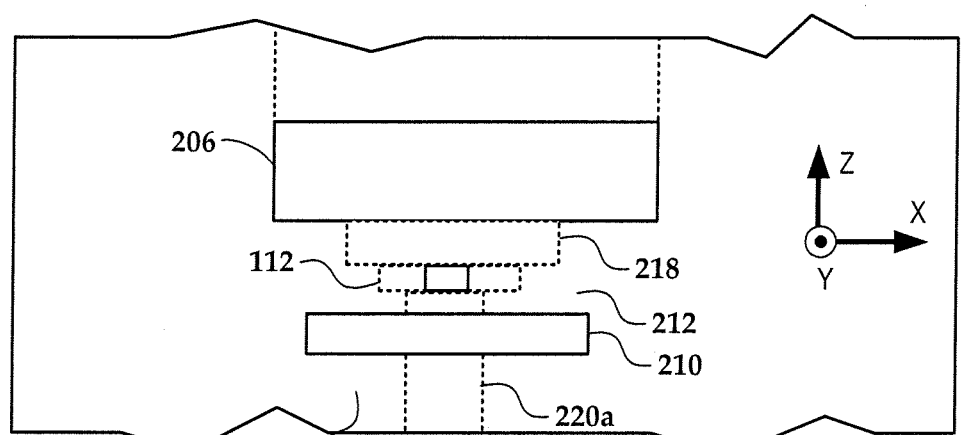
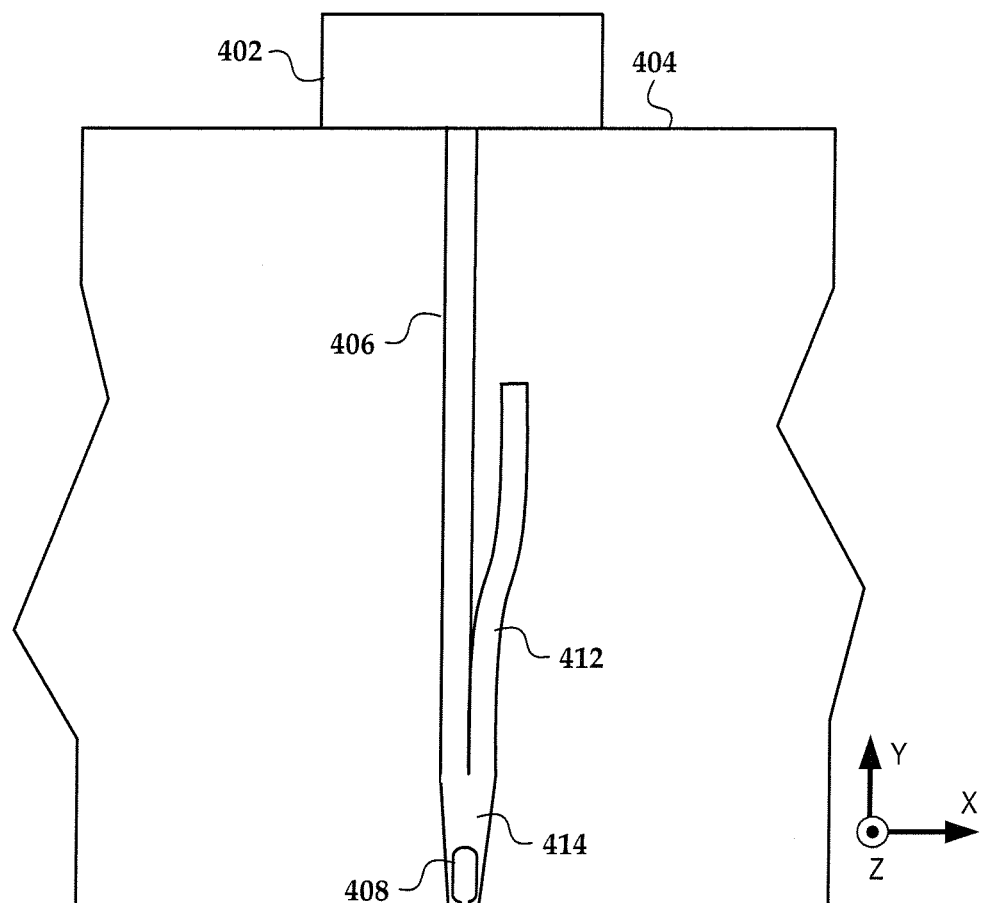

MODE CONVERTER COUPLING ENERGY AT A HIGH-ORDER TRANSVERSE ELECTRIC MODE TO A PLASMONIC TRANSDUCER

BACKGROUND

A heat-assisted, magnetic recording (HAMR) data storage medium uses a high magnetic coercivity material that is able to resist superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

SUMMARY

The present disclosure is related to a mode converter used with a plasmonic transducer. In one embodiment, an apparatus includes a waveguide configured to couple light from a light source at a fundamental transverse electric (TE) mode. A mode converter outputs the light to an output region of the waveguide at a higher-order TE mode. A plasmonic transducer receives the light at the higher order TE mode and generates surface plasmons that heat a recording medium. The plasmonic transducer includes: an input end proximate the output region of the waveguide and comprising a first convex curved edge; an output end proximate a surface that faces the recording medium, the output end comprising a second convex curved edge and a peg; and linear edges between the first and second convex curved edges.

In another embodiment, a method involves directing light from an energy source to a waveguide configured to propagate light at a fundamental transverse electric (TE) mode. The light from the waveguide is converted to a higher-order TE mode. A plasmonic transducer is illuminated with the light at the higher-order TE mode to generate surface plasmons on a surface of the plasmonic transducer. The plasmonic transducer includes a first convex curved edge that faces away from a recording medium, a second convex curved edge that faces the recording medium, a peg on the second convex curved edge, and linear edges between the first and second convex curved edges;. The surface plasmons are directed via the plasmonic transducer to heat a region on the recording medium. A magnetic field is applied to record data at the heated region of the recording medium.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

FIG. 3 is a block diagram showing a view from a media-facing surface of a slider body according to an example embodiment;

FIG. 4 is a block diagram showing a light path with mode converter according to an example embodiment;

DETAILED DESCRIPTION

The present disclosure is generally related to an apparatus (e.g., a HAMR read/write element) having a waveguide and mode convertor that receives light from a light source (e.g., laser diode). The mode converter converts light from a fundamental, transverse electric (TE) mode to a higher order TE mode. The light at the higher-order mode is directed to a plasmonic transducer that generates surface plasmons in response. The surface plasmons are directed to heat a recording medium. The plasmonic transducer is generally configures with convex curved input and output ends that are joined by linear (e.g., straight) edges. A peg is also included at the output end, and facilitates tunneling the surface plasmons to the recording medium.

A HAMR read/write element, sometimes referred to as a slider or read/write head, includes magnetic read and write transducers similar to those on current hard drives. For example, data may be read by a magnetoresistive sensor that detects magnetic fluctuations of a magnetic media as it moves underneath the sensor. Data may be written to the magnetic media by a write coil that is magnetically coupled to a write pole. The write pole changes magnetic orientation in regions of the media as it moves underneath the write pole. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 10 to 100 nm, or any value therebetween) and creates a localized region of high power density in the media through an electromagnetic interaction. This results in a high temperature rise in a small region on the media, with the region exceeding the Curie temperature having dimensions less than 100 nm. This also results in high temperature rise in the slider near the plasmonic transducer due to optical losses in the delivery path.

Figure 1:
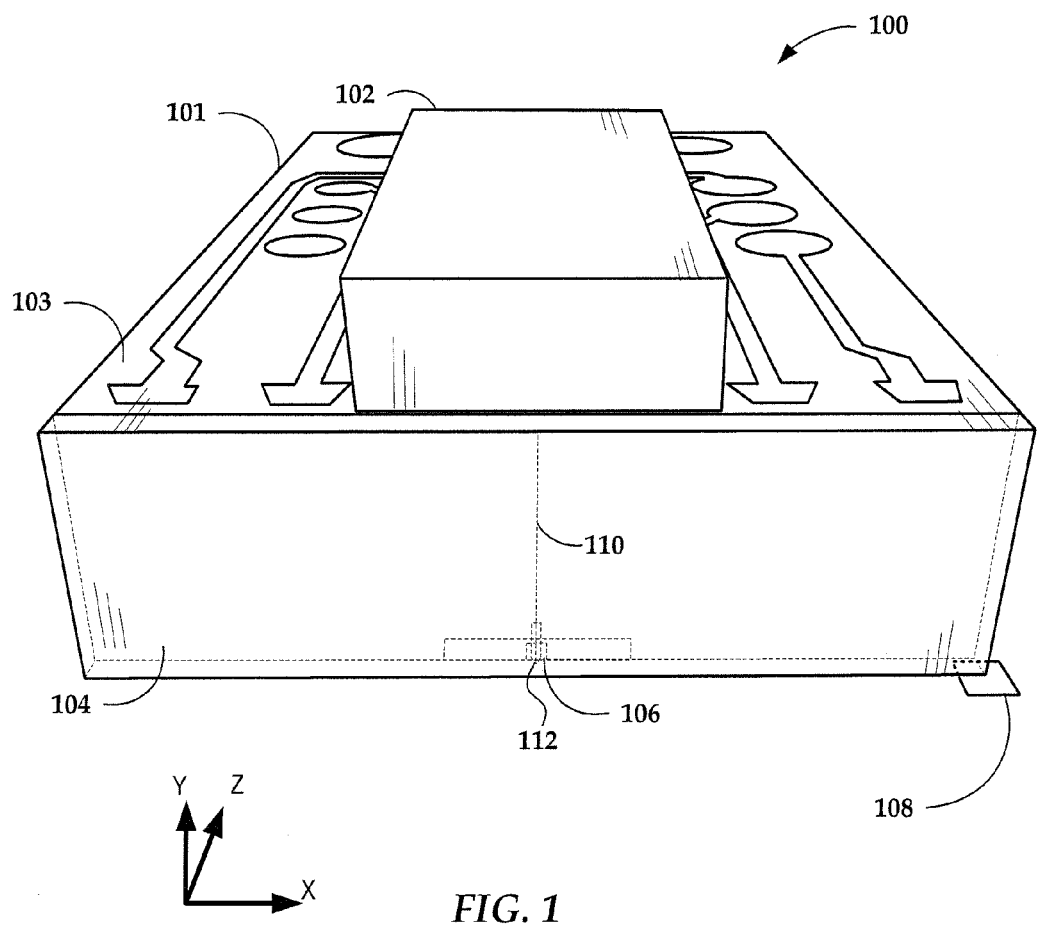
FIG. 1 is a perspective view of a slider assembly according to an example embodiment.

In reference to FIG. 1, a perspective view shows HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide 110, are formed integrally within the slider body 101 (near a trailing edge surface 104 in this example) and function as an optical path that delivers energy from the laser diode 102 to the recording media via a plasmonic transducer 112. The plasmonic transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
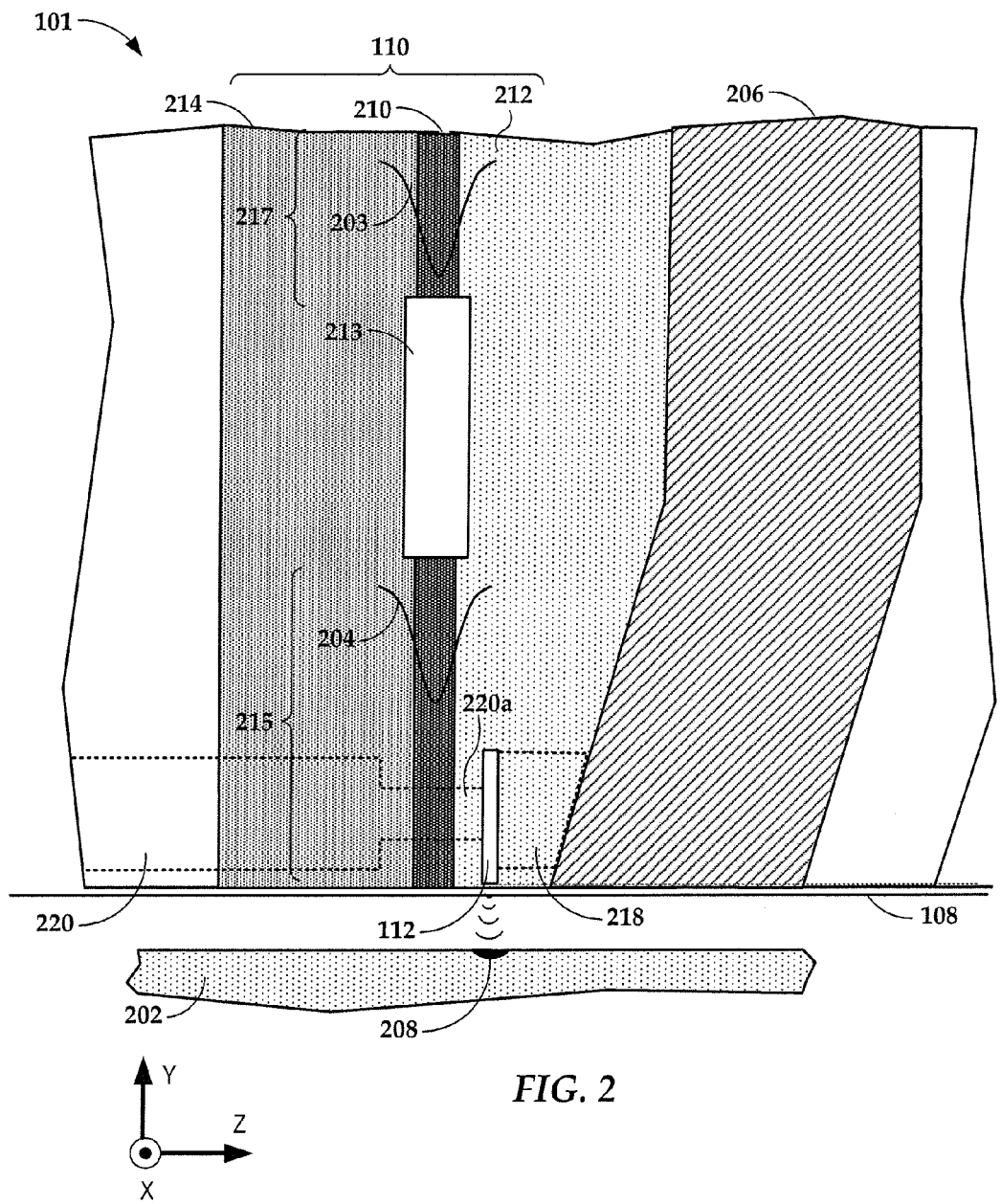
FIG. 2 is a cross-sectional view illustrating portions of a slider body near a plasmonic transducer according to an example embodiment.

In FIG. 2, a cross-sectional view illustrates portions of the slider body 101 near the plasmonic transducer 112 according to an example embodiment. In this view, the plasmonic transducer 112 is shown proximate to a surface of magnetic recording medium 202, e.g., a magnetic disk. The waveguide 110 delivers electromagnetic energy to the plasmonic transducer 112, which directs the energy to create a small hotspot 208 on the medium 202. A magnetic write pole 206 causes changes in magnetic flux near the media facing surface 108 in response to an applied current. Flux from the write pole 206 changes a magnetic orientation of the hotspot 208 as it moves past the write pole 206 in the downtrack direction (z-direction).

The waveguide 110 is configured to receive light 203 from a light source (e.g., laser 102 in FIG. 2) at a fundamental transverse electric (TE) mode (e.g., $TE_{00}$). The waveguide includes a mode converter 213 that outputs light 204 to an output region 215 of the waveguide at a higher-order TE mode (e.g., $TE_{10}$). The plasmonic transducer 112 receives the light 204 at the higher-order mode and generates surface plasmons that heat the magnetic recording medium 202.

At least the output region 215 of the waveguide 110 includes a layer of core material 210 surrounding by cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, SiNx, $Nb_2O_5$, AlN, $Hf_2O_3$, or $Y_2O_3$, etc. Generally, the dielectric materials are selected so that the refractive index of the core layer 210 is higher than refractive indices of the cladding layers 212, 214. This arrangement of materials facilitates efficient propagation of light through the waveguide 110. These or similar materials may also be used to form the mode converter 213 and/or an input portion 217 of the waveguide 110.

The light 204 applied to the plasmonic transducer 112 to create the hotspot 208 can cause a significant temperature rise in the plasmonic transducer 112. The plasmonic transducer 112 may be formed from a relatively soft plasmonic metal (e.g., Au, Ag, Cu, Al, and alloys thereof) that is prone to deformation at high temperature. As a result, a heat sink 218 may be formed proximate to (or integral with) the plasmonic transducer 112. The heat sink 218 may be thermally coupled to other components (e.g., the write pole 206) in order to draw heat away from the plasmonic transducer 112.

Another heat sink 220 may be provided from the opposite side of the plasmonic transducer 112 away from where heat sink 218 is shown. This heat sink 220 may be used instead of or in addition to heat sink 218. The heat sink 220 extends away from a plane (e.g., xy-parallel-plane) defined by the perimeter of the plasmonic transducer 112, and conducts heat elsewhere, e.g., to the media-facing surface 108, slider body 101, or return pole, etc. A part 220a of the heat sink contacts near a center part of the plasmonic transducer 112. The part 220a of the heat sink 220 that contacts the plasmonic transducer 112 has a smaller footprint in the xy-parallel-plane than the plasmonic transducer 112. For example, the footprint of the heat sink part 220a may be one or a few electromagnetic wave skin depths in the plasmonic materials inside from the perimeter of the main part (e.g., rod portion or teardrop portion as shown described in FIGS. 5 and 15) of the plasmonic transducer 112. The footprint of part 220a may have the same outer perimeter shape as the main part of the plasmonic transducer 112 (e.g., rod or tear drop) or a different shape (e.g, circle, rectangle).

The use of a small-footprint heat sink part 220a can minimize impacts to coupling efficiency of the plasmonic transducer 112. This is because surface plasmons are generated surrounding the circumference of the plasmonic transducer 112 (see, e.g., FIGS. 5 and 15 for example outer circumference shapes), and a $TE_{10}$ mode output from the mode converter 213 has minimal field in the center. As a result, because the plasmonic transducer 112 has a relatively larger foot print than heat sink part 220a, the heat-sink 220 will not impact the plasmonic transducer efficiency while still helping to remove the heat generated in the plasmonic transducer 112.

In FIG. 3, a block diagram shows a view from the media facing surface of the slider body shown in FIG. 2. The z-direction is uptrack/downtrack, and the plasmonic transducer 112 is located away from the waveguide core 210. The plasmonic transducer 112 is located in cladding 212 between the waveguide core 210 and the write pole 206. In other embodiments, the plasmonic transducer 112 may be located in the core 210 or at the interface between the core 210 and the cladding 212. The heat sink part 220a is shown extending from the plasmonic transducer 112 in a direction away from the write pole 206 and towards the waveguide core 210.

As noted above, the mode converter 213 may be formed using the waveguide materials, e.g., dielectric materials with different index of refraction for core and cladding. In FIG. 4, a block diagram shows a light path with a mode converter according to an example embodiment. An energy source 402 (e.g., edge-emitting or surface emitting laser diode) is mounted on a slider body 404. Output of the energy source 402 is coupled into a three-dimensional, single mode (e.g., $TE_{00}$) channel waveguide 406.

The channel waveguide 406 extends from the laser diode to a region near a plasmonic transducer 408 that is located proximate a media facing surface 410. An S-bend waveguide 412 joins with the channel waveguide 406 near an output region 414. The light at the output region 414 is converted to a higher-order mode (e.g., $TE_{10}$) due to coupling between the channel waveguide 406 and S-bend waveguide 412. The output region 414 is tapered smaller towards the media facing surface 410. The plasmonic transducer 408 may be located within a core layer of the output region 414, a cladding layer, or between the cladding and core.

Figure 5:
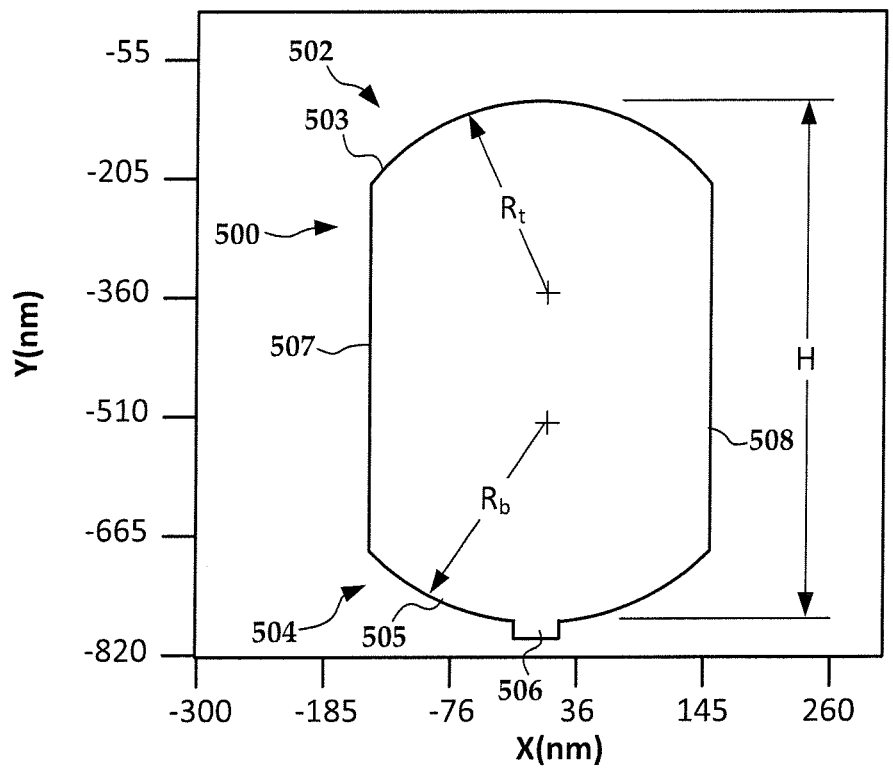
FIG. 5 is a block diagram showing a plasmonic transducer according to an example embodiment.

The plasmonic transducer 408 is formed from a thin layer of plasmonic metal such as gold, silver, copper, etc. A more detailed example embodiment of a plasmonic transducer 500 is shown in the graph of FIG. 5. The x- and y-axes of the graph in FIG. 5 illustrate example dimensions of the plasmonic transducer 500 used to perform simulations described below. It will be understood that these dimensions are provided for purposes of illustration, and not limitation.

The plasmonic transducer 500 includes an input end 502 that is placed proximate a waveguide output region (e.g., output region 414 in FIG. 4). In this example, the input end 502 includes a first convex curved edge 503. The plasmonic transducer 500 includes an output end 504 proximate a media facing surface (e.g., surface 410 in FIG. 4). The output end 504 includes a second convex curved edge and a peg 506. Linear edges 507, 508 join the first and second convex curved edges 503, 505. The convex curved edges 503, 505 and linear edges 507, 508 form a perimeter around an area that may be referred to as a "rod," and the rod area is filled by a layer of plasmonic material (e.g., gold), as is the peg.

The linear edges 507, 508 and the first and second convex curved edges 503, 505 define an outer perimeter of the plasmonic transducer 500, a region within the outer perimeter being filled with a layer of plasmonic material (e.g., a thin layer of gold, silver, aluminum, copper, or other plasmonic metal). In this example, the convex curved edges 503, 505 are circular, as indicated by radiuses Rt and Rb. It will be understood that other curved shapes may be used (e.g., elliptical, parabolic, etc.) for the convex curved edges 503, 505. In such a case, the radiuses Rt and Rb may be understood to represent an analogous geometric parameter that allows comparing at least width between the first and second convex curved edges. For example, in this case, where Rt=Rb, the widths of the input and output ends 1502, 1504 are about the same such that linear edges 1507, 1508 are substantially parallel to one another.

Generally, the convex shape of the first curved edge 503 reduces reflection of incoming light. The convex shape of the second curved edge 505 improves the impedance match between the rod and the peg 506 such that the impedance gradually increases along the perimeter. The parallel linear edges 507, 508 causes the electric field to normal to the circumference of the plasmonic transducer 500, which results in efficient excitation of local surface plasmons. The plasmonic transducer 500 interacts with incident light, e.g., the $TE_{10}$ waveguide mode, generating local surface plasmon at the interface of the plasmonic transducer 500 and surrounding cladding material (e.g., cladding 212 in FIG. 3), and funnels charges to the peg 506, resulting in a lightning effect.

In the following discussion, an analysis was performed to determine an optimum configuration of the $TE_{10}$ waveguide and plasmonic transducer 500. Physical parameters considered in the optimization include end curvature Rt, Rb, rod height H, and peg height of the transducer 500, as well as cross-sectional dimensions of the channel waveguide. The light delivery path (e.g., output region 414 in FIG. 4) includes a taper that is intended to connect the waveguide at the end of the mode converter (e.g., end of waveguides 406, 412) and the output region 414 where the plasmonic transducer is placed.

In reference again to FIG. 3, an example waveguide was modeled with a TiOx (refractive index n=2.35) core 210 that is surrounded with $SiO_2$ (n=1.46) cladding 212, 214. The waveguide core 210 is fixed with a 120 nm thickness (along the z-direction) while the core width varies for NFT efficiency. The plasmonic transducer is modeled as shown in FIG. 5, with circular convex curved edges 503, 505 of the same radius of curvature, R=Rt=Rb. The height of linear edges 507, 508 and the end radius of curvature R are optimized for energy coupling efficiency.

The plasmonic transducer is placed 20-nm away from the core. Peg dimension is 40-nm wide along the x-direction (cross-track), 30-nm thick along z direction (down-track), and 20-nm high into the media-facing surface (along the y direction). Light wavelength λ=830 nm. A storage medium is placed underneath the media facing surface as shown in FIG. 2. The storage medium includes a FePt layer (12.6 nm thick, complex refractive index n=2.55+j 2.72), a MgO layer (10 rim thick, n=1.70), and a heat-sink Cu layer (60 nm, n=0.26+j 5.29) on a glass substrate. The head-medium spacing is 8 nm, effective index n=1.21.

The analyses shown below attempt to optimize plasmonic transducer efficiency, CE50, which is defined as the light absorption in the FePt layer in a foot print of 50 nm by 50 nm. A magnetic pole is slanted and connected with the rod by a heat-sink (see transducer 112 and heat sink 218 in FIG. 2). Both plasmonic transducer and associated heat-sink are made of gold. The spacing between the write pole and plasmonic transducer at the media-facing surface is 20 nm. The write pole is 200-nm wide along x direction and wrapped with Cr-heat sink. The total width (along the x-direction) of the pole plus heat-sink is 600-nm. The heat-sink/pole is truncated at the far-end of the plasmonic transducer.

Figure 6:
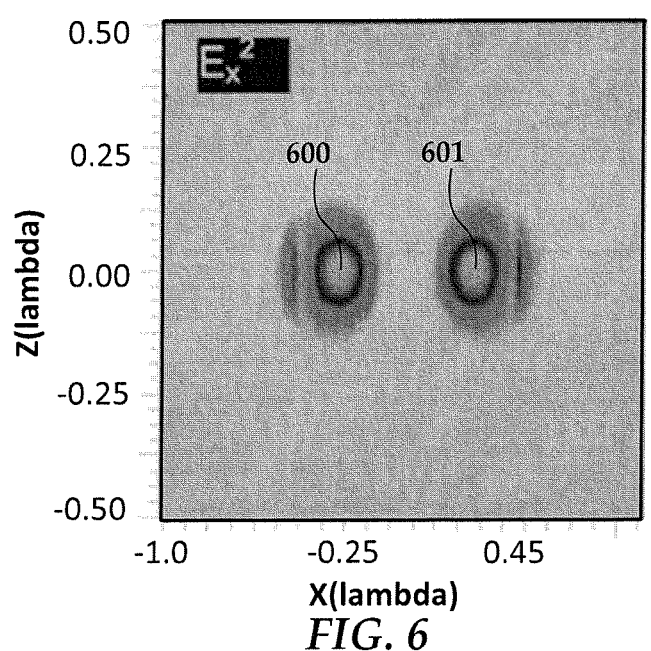
FIG. 6 is a graph showing predicted electric field Ex generated by a plasmonic transducer as shown in FIG. 5.
Figure 7:
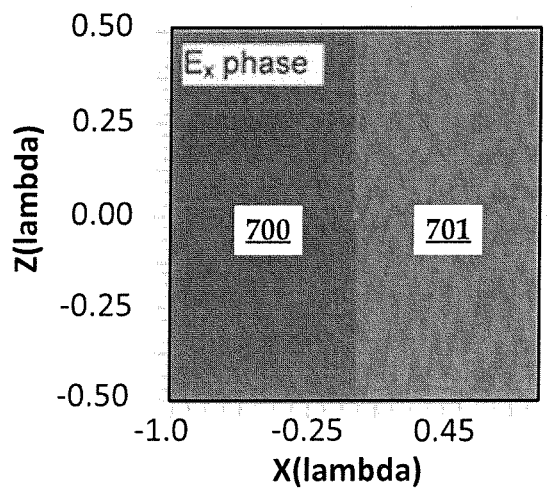
FIG. 7 is a graph showing predicted phase angle of Ex generated by a plasmonic transducer as shown in FIG. 5.
Figure 8:
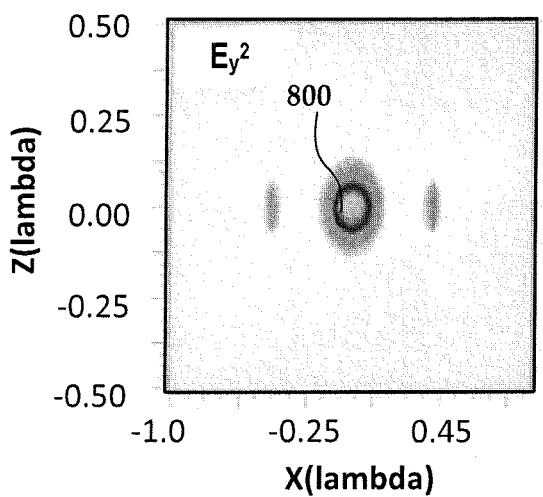
FIG. 8 is a graph showing predicted electric field Ey generated by a plasmonic transducer as shown in FIG. 5.
Figure 9:
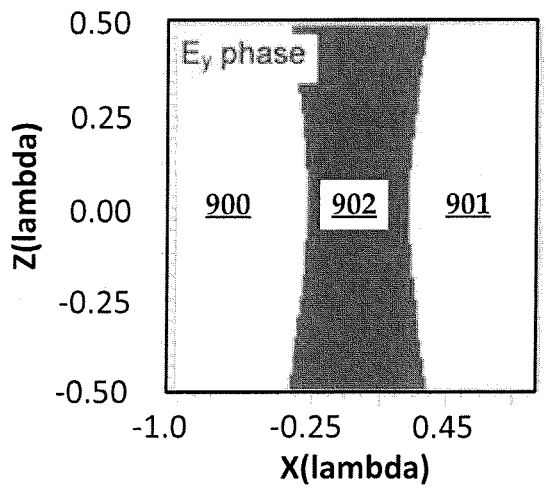
FIG. 9 is a graph showing predicted phase angle of Ey generated by a plasmonic transducer as shown in FIG. 5.

In FIG. 6, a graph shows the strength of the x-component (Ex) of the electric field in the $TE_{10}$ mode, which is at maximum of 1900 v/m at regions 600, 601. Lambda denotes light wavelength in a vacuum. In FIG. 7, a graph shows phase of Ex in the $TE_{10}$ mode, which is about −60 degrees in region 700 and about 120 degrees in region 701. In FIG. 8, a graph shows the strength of the y-component (Ey) of the electric field in the $TE_{10}$ mode, which is at maximum of 530 v/m at region 800. In FIG. 9, a graph shows phase of Ey in the $TE_{10}$ mode, which is about 30 degrees in regions 900 and 901 and about −150 degrees in region 902. The waveguide core is 750 nm wide by 120 nm thick. Ex is the dominated electric field component and there are two lobes in the field profile with a phase difference of π (180 degrees) between two lobes, a characteristic of the first higher order, $TE_{10}$. As expected, there is also a longitudinal component, Ey, but much weaker than the transverse component Ex.

Figure 10:
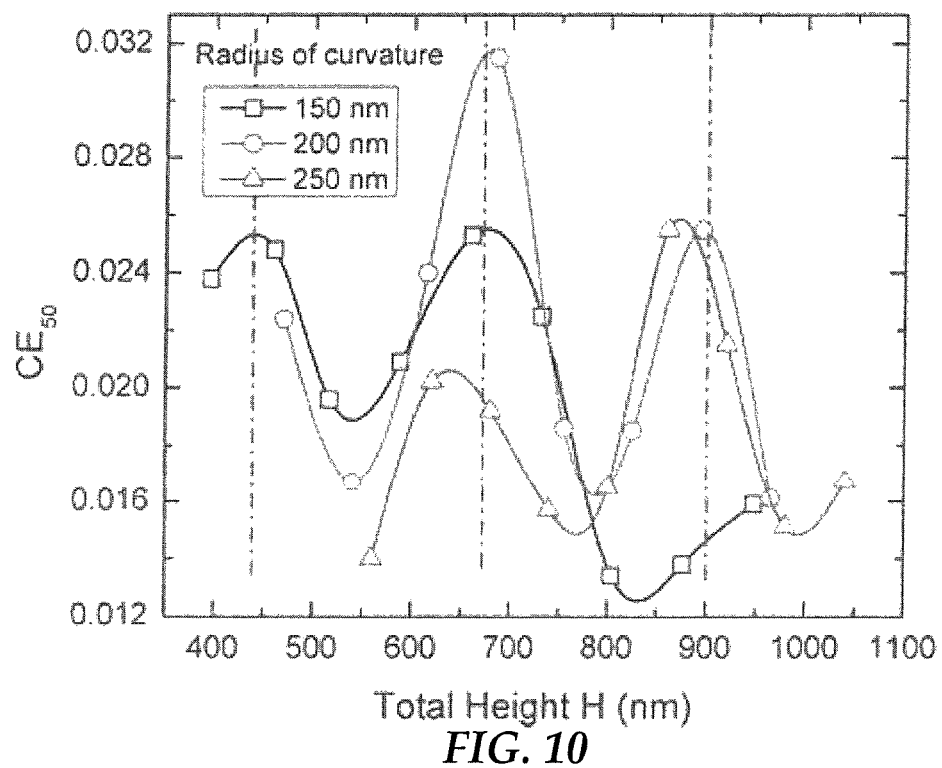
FIG. 10 is a graph showing predicted plasmonic transducer efficiency as a function of rod height at three values of end radius of curvature for a plasmonic transducer as shown in FIG. 5.

In FIG. 10, a graph shows the plasmonic transducer efficiency as a function of rod height H at three values of end radius of curvature: R=150, 200, and 250 nm. For this modeling, the waveguide core width is 672 nm for R=150 nm and 200 nm and 750 nm for R=250 nm. There are two or three resonances in the height range studied. At R=200 nm, the plasmonic transducer efficiency is peaked at the second resonance mode.

Figure 11:
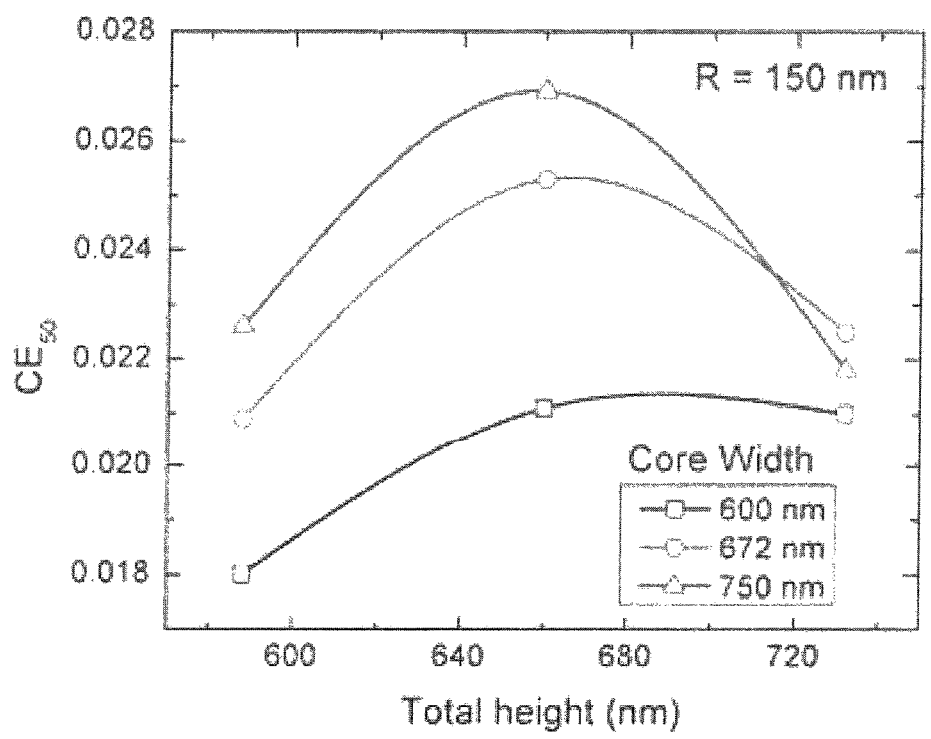
FIGS. 11-13 are graphs showing predicted plasmonic transducer efficiency as a function of rod height for differing waveguide widths for a plasmonic transducer as shown in FIG. 5.
Figure 12:
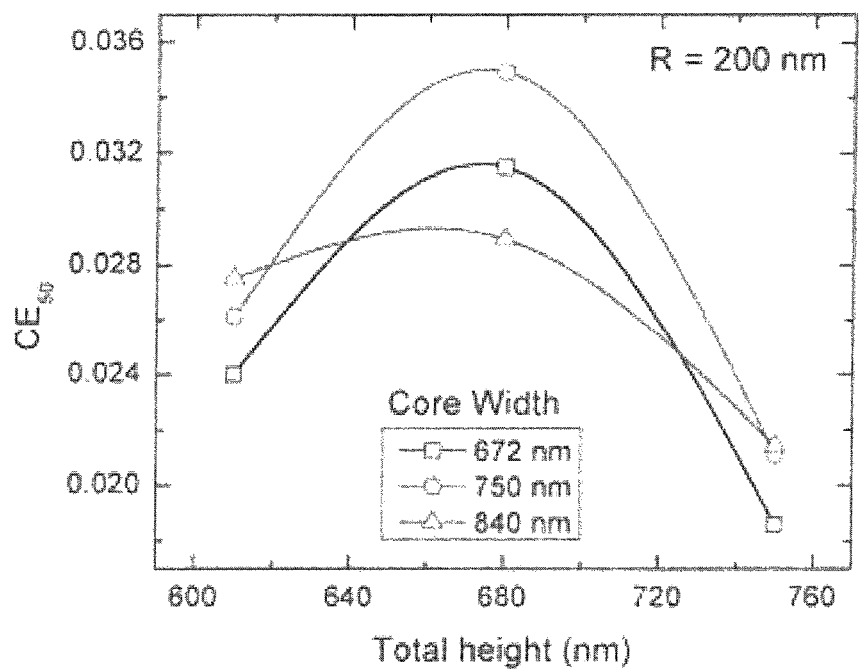
Figure 13:
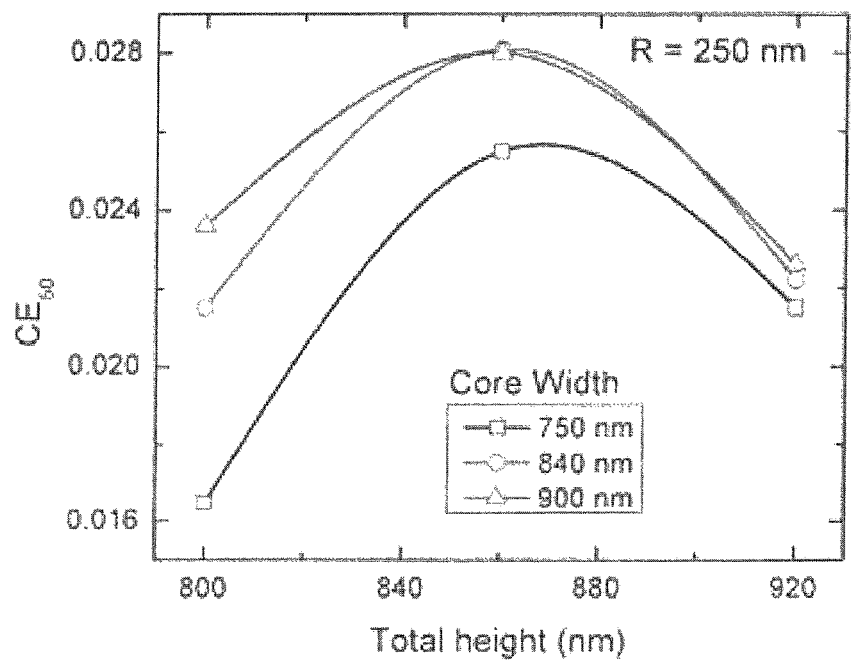

In FIGS. 11-13, graphs shows the plasmonic transducer efficiency as a function of rod height around the second resonance mode for R=150 nm (FIGS. 11) and 200 nm (FIG. 12) and around the third resonance mode for end R=250 nm (FIG. 13) at three differing waveguide widths. It is evident that the plasmonic transducer excitation efficiency is dependent on waveguide core width. As seen in FIG. 12, a configuration with R=200 nm, rod height H=670 nm, and waveguide core width=750 nm, the plasmonic transducer efficiency is optimal.

Figure 14:
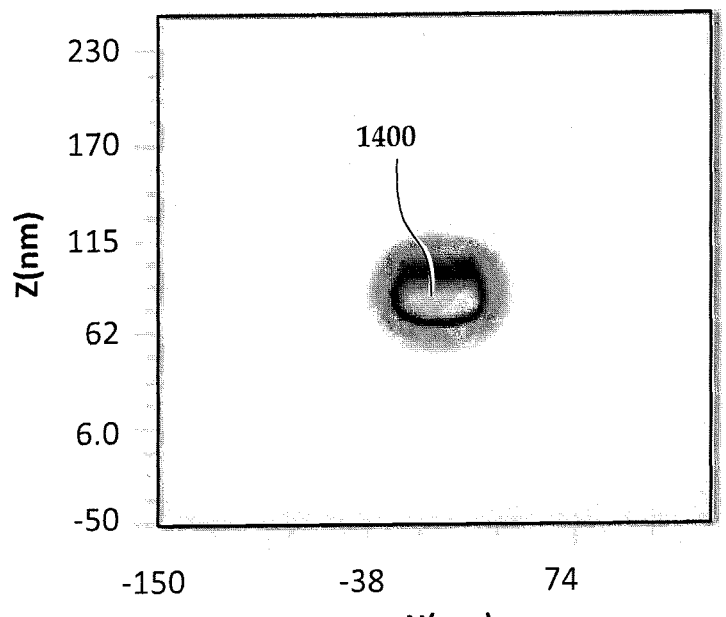
FIG. 14 is a graph showing predicted profile of light absorption at a middle plane of the recording layer for a plasmonic transducer as shown in FIG. 5.

In FIG. 14, a graph shows the profile of light absorption at the middle plane of the recording layer for end R=200 nm and rod height=680 nm. The optical spot has full-width-at-half-maximum spot size of 62 nm (along x direction, cross-track) by 56 nm (along z-direction, down-track), CE50=0.0349, the ratio of peg absorption to CE50=0.398. The peak light absorption per unit volume is 1200 watt/μm³ at region 1400.

Figure 15:
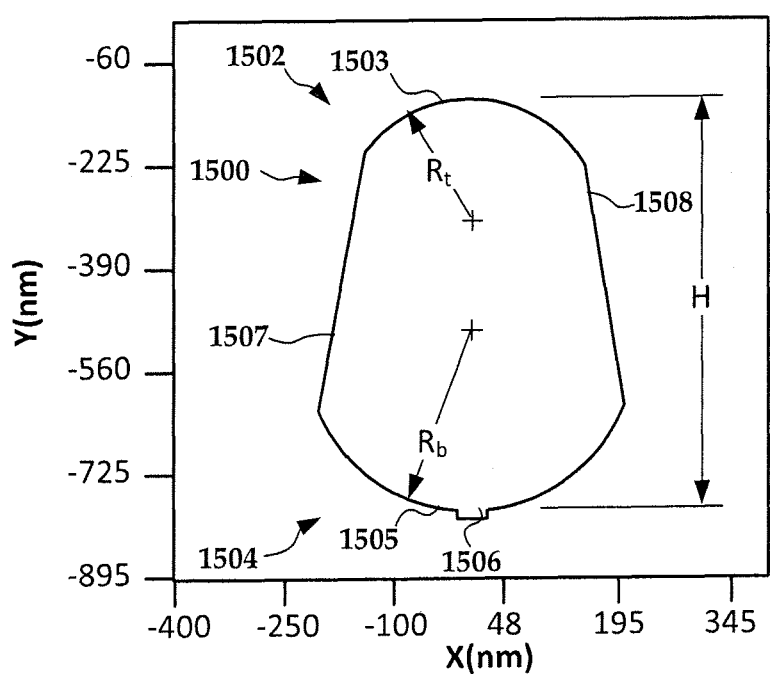
FIG. 15 is a block diagram showing a plasmonic transducer according to another example embodiment.

In reference now to FIG. 15, a graph shows a plasmonic transducer 1500 according to another example embodiment. The plasmonic transducer 1500 includes an input end 1502 that is placed proximate a waveguide output region (e.g., output region 414 in FIG. 4). In this example, the input end 1502 includes a first convex curved edge 1503. The plasmonic transducer 1500 includes an output end 1504 proximate a media facing surface (e.g., surface 410 in FIG. 4). The output end 1504 includes a second convex curved edge and a peg 1506. Linear edges 1507, 1508 join the first and second convex curved edges 1503, 1505. The convex curved edges 1503, 1505 and linear edges 1507, 1508 form a perimeter around an area that may be referred to herein as a "teardrop," and the teardrop are is filled by a layer of plasmonic material (e.g., gold), as is the peg.

In this example, the convex curved edges 1503, 1505 are circular, as indicated by radiuses Rt and Rb, where Rt<Rb. It will be understood that other curved shapes may be used (e.g., elliptical, parabolic, etc.). In such a case, the radiuses Rt and Rb may be understood to represent an analogous geometric parameter that allows comparing at least a width of the first and second convex curved edges. For example, in this case R<Rb, and as a result the widths of the input and output ends 1502, 1504 are different such that linear edges 1507, 1508 are substantially non-parallel to one another.

Figure 16:
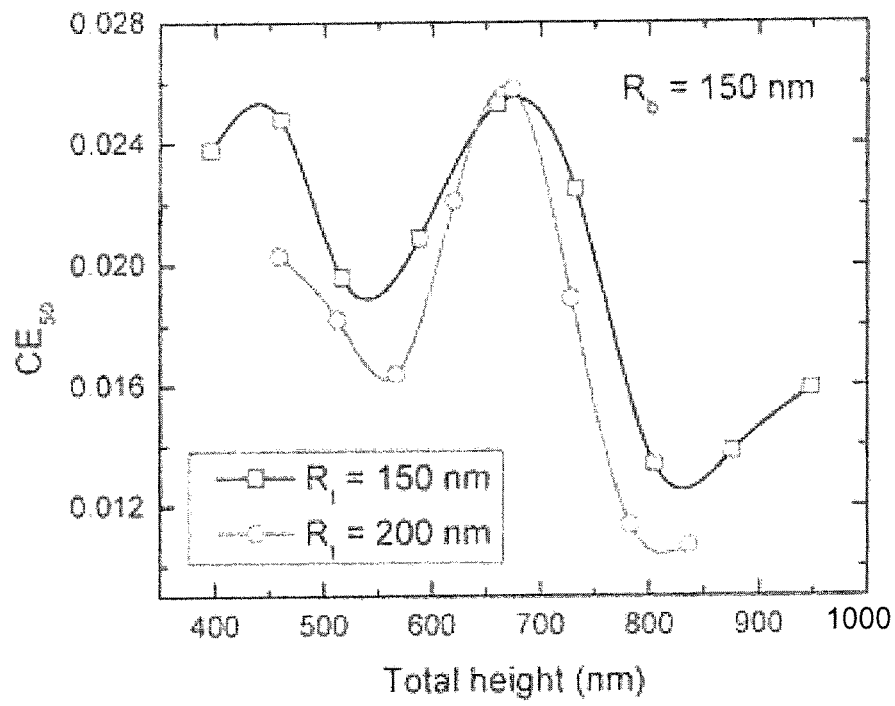
FIGS. 16-18 are graphs showing predicted plasmonic transducer efficiency for various geometries of a plasmonic transducer as shown in FIG. 15.
Figure 17:
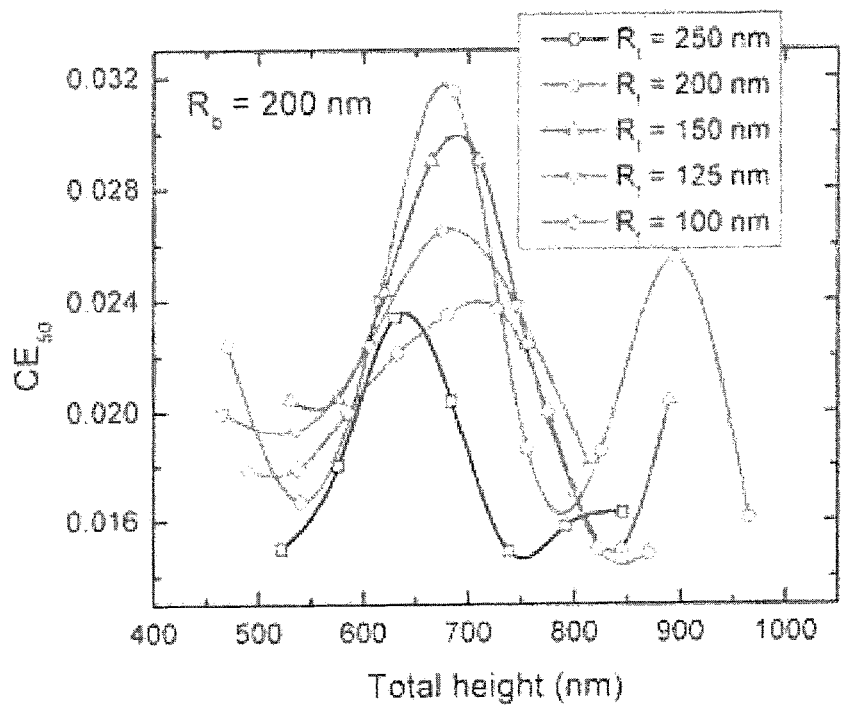
Figure 18:
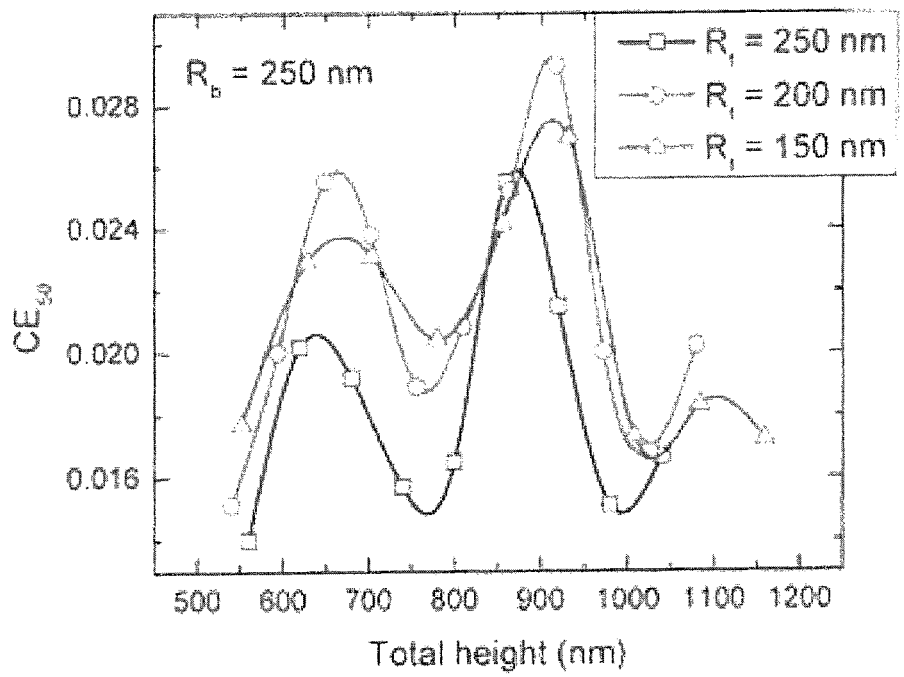

The convex curved edges 1503, 1504 provide similar functions as described for curved edges in other embodiments that are described hereinabove. The height H is again measured from the top convex curved edge 1503 to the bottom of the second convex curved edge 1505. A different analysis was performed with this configuration of a plasmonic transducer 1500. Results of the analysis are shown in FIGS. 16-18. The waveguide core is not fully optimized in the examples of FIG. 16-18.

In FIG. 16, plasmonic transducer efficiency is shown for a configuration where Rb=150 nm and Rt varied between 150 nm and 200 nm. The waveguide core is 672 nm by 120 nm for this case. The maximum efficiency is seen around H=675 nm. In FIG. 17, plasmonic transducer efficiency is shown for a configuration where Rb=200 nm and Rt varied between 100 nm and 250 nm. The waveguide core is again 672 nm by 120 nm for this case, and again maximum efficiency is seen around H=675 nm. In FIG. 18, plasmonic transducer efficiency is shown for a configuration where Rb=250 nm and Rt varied between 150 nm and 250 nm. The waveguide core is 750 nm by 200 nm for this case, and in this case the maximum efficiency is seen around H=900 nm. It should be noted that in these analyses that the plasmonic transducer efficiency is maximized if at least one of the radiuses Rb, Rt is 200 nm.

Figure 19:
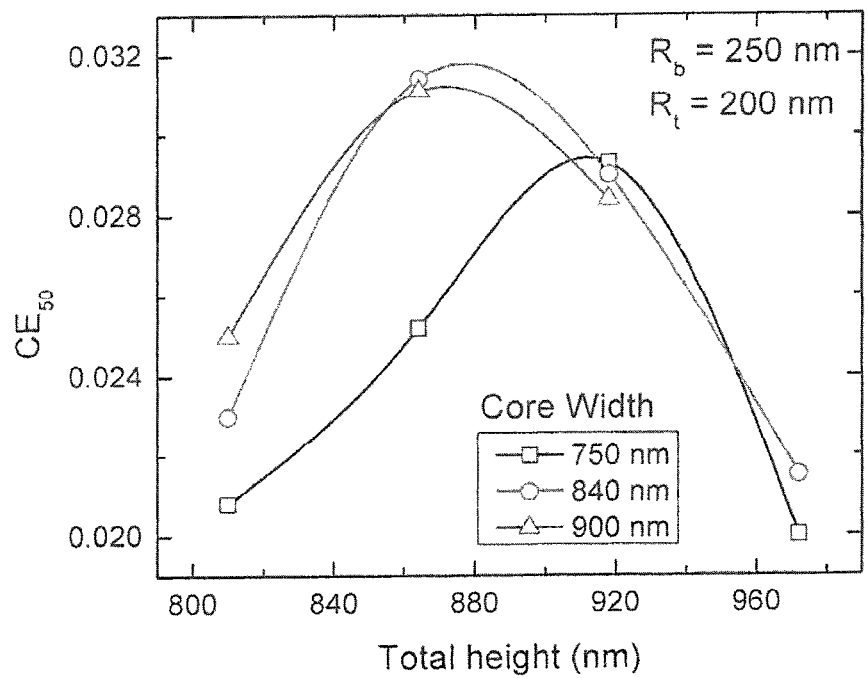
FIG. 19 is a graph showing predicted transducer efficiency for various waveguide core widths for a plasmonic transducer as shown in FIG. 15.

In FIG. 19, a graph shows one optimization of waveguide core width around the third mode for Rb=250 nm, and Rt=200 nm (see FIG. 18). Plasmonic transducer efficiency reaches 0.032 for core width=840 and H=880 nm. This is only 10% lower than the rod shape with end R=200 nm (see FIG. 12). It is possible that efficiency of this shape can be increased by changing other parameters, e.g., peg height, core height etc., and the greater volume of the tear drop shape might have other advantages, e.g., greater thermal mass.

Generally, the use of the above described plasmonic transducer shapes used with a mode converter can provide good power transfer efficiency, as well as improving the ratio of peg absorption to power transfer efficiency. Further, such a design does not require an element such as a solid-immersion mirror (SIM) to focus light onto the plasmonic transducer. As such, yield can be improved by removing the need to precisely align overlays of waveguide, SIM, and plasmonic transducer.

Figure 20:
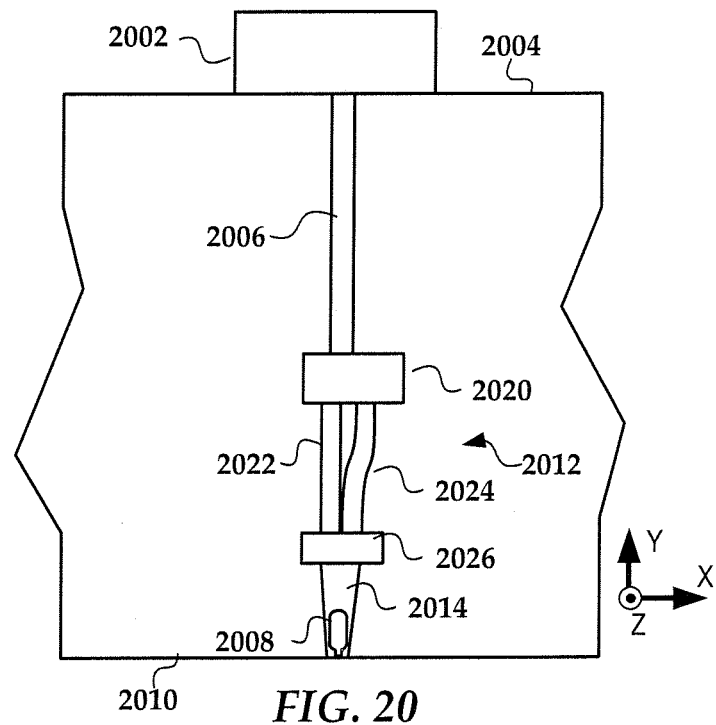
FIGS. 20 and 21 are block diagram illustrating mode converters according to other embodiments.

As previously noted, the plasmonic transducers described above are be used with a mode converter. The example mode converter shown in FIG. 4 receives light at a fundamental $TE_{00}$ mode, and outputs at a higher-order $TE_{10}$ mode. This can be extended to other higher order modes $TE_{n,0}$ mode, where n>0, and other mode converters may be used. A light delivery path with an example embodiment of a mode converter is shown in FIG. 20. An energy source 2002 (e.g., edge-emitting or surface emitting laser diode) is mounted on a slider body 2004. Output of the energy source 2002 is coupled into a waveguide 2006, e.g., three-dimensional, single mode (e.g., $TE_{00}$) channel waveguide.

The waveguide 2006 extends from the laser diode 2002 to a mode converter 2012. The mode converter 2012 includes a splitter 2020 that splits the light into two branches 2022, 2024 of differing length, and a combiner 2026 that combines the light from the two branches 2022, 2024. The output of the combiner 2026 is sent to an output region 2014 that couples the light to a plasmonic transducer 2008 that is located proximate a media facing surface 2010. The splitter 2020 and/or combiner 2026 may be configured as a multi-mode interference (MMI) coupler.

The plasmonic transducer 2008 may be configured as shown in FIG. 5 or FIG. 15, and may be located within a core layer of the output region 2014, a cladding layer, or between the cladding and the core. The mode converter 2012 converts light to a higher-order mode (e.g., $TE_{10}$), the higher-order mode light being coupled to the plasmonic transducer 2008. Other higher order modes, e.g., $TE_{20}$, may be obtained by adding more branches.

Figure 21:
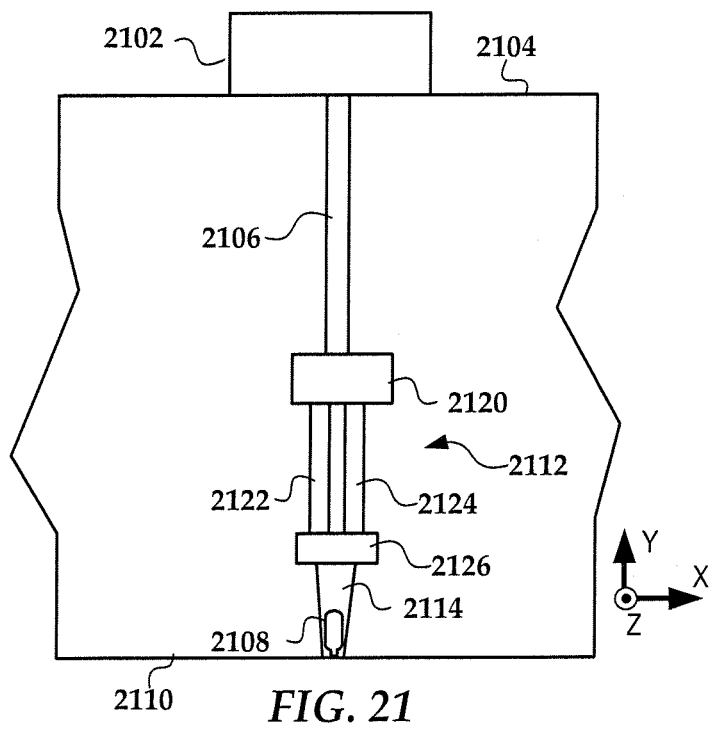

A light delivery path with another example embodiment of a mode converter is shown in FIG. 21. An energy source 2102 (e.g., edge-emitting or surface emitting laser diode) is mounted on a slider body 2104. Output of the energy source 2102 is coupled into a waveguide 2106, e.g., three-dimensional, single mode (e.g., $TE_{00}$) channel waveguide. The waveguide 2106 extends from the laser diode 2102 to mode converter 2112. The mode converter 2112 includes a splitter 2120 that splits the light into two directionally coupled waveguides 2122, 2124, and a combiner 2126 that combines the light from the two waveguides 2122, 2124. The splitter 2120 and/or combiner 2126 may be configured as an MMI. The directionally coupled waveguides 2122, 2124 may have a slight difference in length to induce an Mπ phase shift, wherein M=1, 3, 5, etc.

The output of the combiner 2126 is sent to an output region 2114 that couples the light to a plasmonic transducer 2108 that is located proximate a media facing surface 2110. The mode converter 2112 converts light to a higher-order mode (e.g., $TE_{10}$), the higher-order mode light being coupled to the plasmonic transducer 2108. Other higher order modes, e.g., TE $TE_{20}$, may be obtained by adding more directionally coupled waveguides. The plasmonic transducer 2108 may be configured as shown in FIG. 5 or FIG. 15. The plasmonic transducer 2108 may be located within a core layer of the output region 2114, a cladding layer, or between the cladding and the core.

Figure 22:
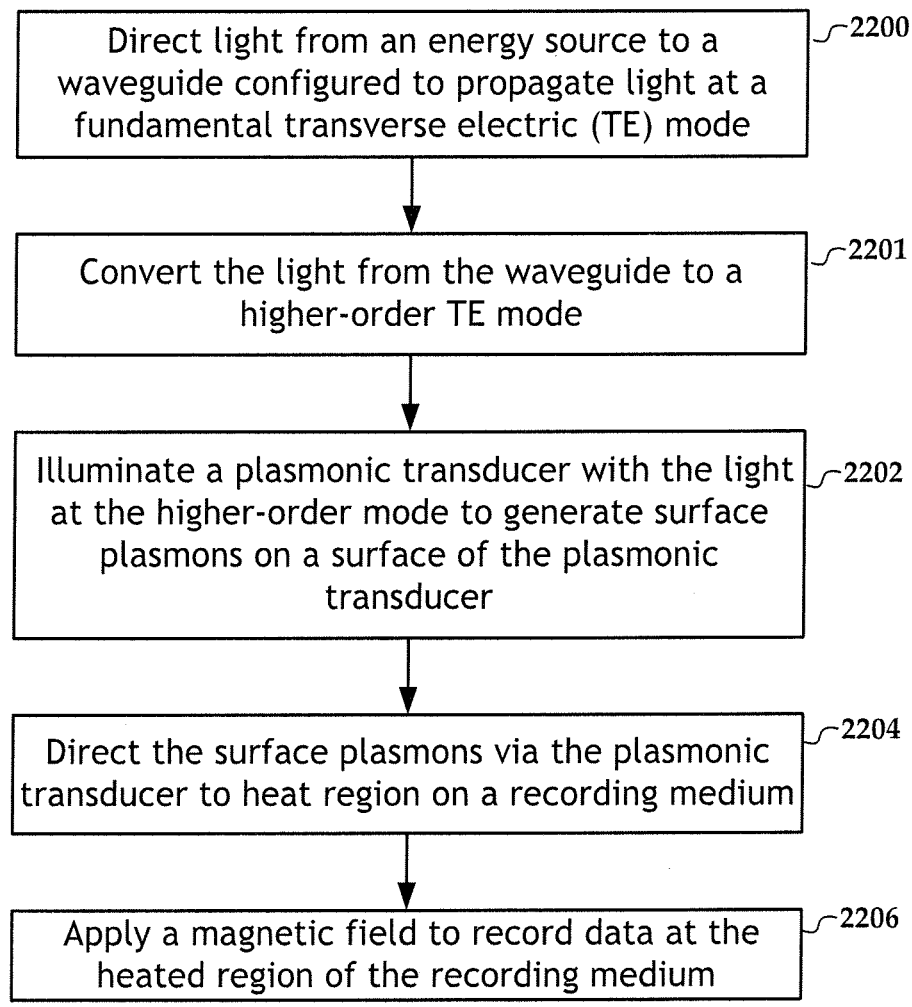
FIG. 22 is a flowchart illustrating a method according to an example embodiment.

In reference now to FIG. 22, a flowchart illustrates a method according to an example embodiment. The method involves directing 2200 light from an energy source to a waveguide configured to propagate light at a fundamental TE mode. The light is converted 2201 to a higher-order TE mode, which is used to illuminate 2202 a plasmonic transducer to generate surface plasmons on a surface of the plasmonic transducer.

The plasmonic transducer includes at least a first convex curved edge that faces away from a recording medium, a second convex curved edge that faces the recording medium, a peg on the second convex curved edge, and linear edges between the first and second convex curved edges. The surface plasmons are directed 2204 via the plasmonic transducer to heat a region on the recording medium. This, for example, heats the region above the Curie which lowers magnetic coercivity in the region. A magnetic field is then applied 2206 to record data at the heated region of the recording medium.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
   a waveguide configured to couple light from a light source at a fundamental transverse electric (TE) mode;
   a mode converter that outputs the light to an output region of the waveguide at a $TE_{10}$ mode; and
   a plasmonic transducer receiving the light at the $TE_{10}$ and generating surface plasmons that heat a recording medium, the plasmonic transducer comprising:
      an input end proximate the output region of the waveguide and comprising a first convex circular edge;
      an output end proximate a surface that faces the recording medium, the output end comprising a second convex circular edge and a peg; and
      linear edges between the first and second convex circular edges.

2. The apparatus of claim 1, wherein the output end of the plasmonic transducer is wider than the input end, such that the linear edges are non-parallel.

3. The apparatus of claim 1, wherein the linear edges are parallel.

4. The apparatus of claim 1, wherein the linear edges and the first and second convex circular edges define an outer perimeter of the plasmonic transducer, a region within the outer perimeter being filled with a layer of plasmonic material.

5. The apparatus of claim 1, wherein the output region of the waveguide comprises a channel waveguide section that includes a core and cladding, and wherein the plasmonic transducer is disposed in the cladding proximate the core.

6. The apparatus of claim 1, wherein the mode converter comprises a branching S-bend, a first end of the S-bend joining the waveguide and a second end of the S-bend extending towards a top surface to which the waveguide extends, the second end of the S-bend being terminated before reaching the top surface.

7. The apparatus of claim 1, wherein the mode converter comprises a multi-mode interference mode converter.

8. The apparatus of claim 1, wherein the mode converter comprises a splitter that splits the light into two branches of differing length, and a combiner that combines the light from the two branches.

9. The apparatus of claim 1, wherein the apparatus comprises a heat-assisted recording media write head.

10. The apparatus of claim 1, wherein the fundamental mode TE comprises a $TE_{00}$ mode.

11. The apparatus of claim 1, further comprising a heat sink extending away from a plane of the plasmonic transducer, the heat sink having a first part that contacts a center of the plasmonic transducer at the plane, the first part of the heat sink having a footprint in the plane smaller than the plasmonic transducer.

12. The apparatus of claim 11, wherein the heat sink extends from a side of the plasmonic transducer that faces away from a write pole.

13. The apparatus of claim 1, wherein a distance between the input end and the output end of the pasmonic transducer is at least 30 times larger than a height of the peg, the height measured from the output end towards the recording medium.

14. The apparatus of claim 1, wherein the plasmonic transducer comprises a heat sink extending towards a write pole.

15. An apparatus comprising:
   a three-dimensional, channel waveguide configured to couple light from a light source at a transverse electric $TE_{00}$ mode;

a mode converter that outputs the light to an output region of the channel waveguide at a $TE_{10}$ mode; and a plasmonic transducer receiving the light at the $TE_{10}$ mode and generating surface plasmons that heat a recording medium, the plasmonic transducer comprising:

a first convex circular edge proximate the output region;

a second convex circular edge and a peg that faces the recording medium; and linear edges between the first and second convex circular edges, wherein the linear edges and the first and second convex curved edges define an outer perimeter of the plasmonic transducer, a region within the outer perimeter being filled with a layer of plasmonic material.

16. The apparatus of claim 15, wherein the second convex circular edge of the plasmonic transducer has the same width as the first circular curved edge, such that the linear edges are parallel.

17. The apparatus of claim 15, further comprising a heat sink extending away from a plane of the plasmonic transducer, the heat sink having a first part that contacts a center of the plasmonic transducer at the plane, the first part of the heat sink having a footprint in the plane smaller than the plasmonic transducer.

18. The a apparatus of claim 15, wherein the mode converter comprises a branching S-bend, a first end of the S-bend joining the waveguide and a second end of the S-bend extending towards a top surface to which the waveguide extends, the second end of the branching S-bend being terminated before reaching the top surface.

19. A method comprising:

directing light from an energy source to a waveguide configured to propagate light at a fundamental transverse electric (TE) mode;

converting the light from the waveguide to a $TE_{10}$ mode;

illuminating a plasmonic transducer with the light at the $TE_{10}$ mode to generate surface plasmons on a surface of the plasmonic transducer, the plasmonic transducer comprising a first convex circular edge that faces away from a recording medium, a second convex circular edge that faces the recording medium, a peg on the second convex circular edge, and linear edges between the first and second convex circular edges;

directing the surface plasmons via the plasmonic transducer to heat a region on the recording medium; and applying a magnetic field to record data at the heated region of the recording medium.

20. The method of claim 19, wherein the second convex circular edge of the plasmonic transducer has the same width as the first convex circular edge, such that the linear edges are parallel.

* * * * *